United States Patent
Weihs et al.

(10) Patent No.: US 8,434,104 B2
(45) Date of Patent: Apr. 30, 2013

(54) SYSTEM AND METHOD OF SCHEDULING ADVERTISING CONTENT FOR DYNAMIC INSERTION DURING PLAYBACK OF VIDEO ON DEMAND ASSETS

(75) Inventors: Joseph Weihs, Arlington, MA (US); Stephen B. Flaherty, Durham, NH (US)

(73) Assignee: SeaChange International, Inc., Acton, MA (US)

( * ) Notice: Subject to any disclaimer, the term of this patent is extended or adjusted under 35 U.S.C. 154(b) by 480 days.

(21) Appl. No.: 12/328,441

(22) Filed: Dec. 4, 2008

(65) Prior Publication Data

US 2010/0146542 A1    Jun. 10, 2010

(51) Int. Cl.
*H04N 7/025*      (2006.01)

(52) U.S. Cl.
USPC .......................................................... 725/34

(58) Field of Classification Search .................. None
See application file for complete search history.

(56) References Cited

U.S. PATENT DOCUMENTS

| | | | |
|---|---|---|---|
| 2002/0066106 A1 | 5/2002 | Kanojia et al. | |
| 2002/0123928 A1* | 9/2002 | Eldering et al. | 705/14 |
| 2004/0003413 A1* | 1/2004 | Boston et al. | 725/133 |
| 2005/0096978 A1 | 5/2005 | Black | 705/14 |
| 2006/0031914 A1 | 2/2006 | Dakss et al. | |
| 2006/0206912 A1 | 9/2006 | Klarfeld et al. | 725/40 |
| 2006/0293954 A1* | 12/2006 | Anderson et al. | 705/14 |
| 2007/0055994 A1* | 3/2007 | Orihara | 725/46 |
| 2008/0046924 A1* | 2/2008 | Hood | 725/36 |
| 2008/0141307 A1* | 6/2008 | Whitehead | 725/46 |
| 2009/0187948 A1* | 7/2009 | Malik | 725/49 |
| 2009/0241142 A1* | 9/2009 | Schuster et al. | 725/32 |
| 2009/0298480 A1* | 12/2009 | Khambete et al. | 455/414.1 |
| 2009/0307732 A1* | 12/2009 | Cohen et al. | 725/87 |
| 2010/0251288 A1* | 9/2010 | Carlucci et al. | 725/32 |

FOREIGN PATENT DOCUMENTS

WO      01/89213 A1    11/2001

OTHER PUBLICATIONS

Search Report dated Feb. 10, 2010 for Application No. GB0920982.6 (1 page).
http://www.stratag.com/news/mediapress022106.html, "VOD Integration Now Available in Strata," Strata News, Strata Marketing, Inc. website, last visited on Jun. 8, 2009 (1 page).
Supplemental Search Report issued by the UK Intellectual Property Office for application No. GB0920982.6 dated Aug. 10, 2010, one page.

* cited by examiner

*Primary Examiner* — Vivek Srivastava
*Assistant Examiner* — Rong Le
(74) *Attorney, Agent, or Firm* — Proskauer Rose LLP

(57) ABSTRACT

Described are computer-based methods and apparatuses, including computer program products, for scheduling advertising content for dynamic insertion during play of video on demand assets. A virtual linear program channel is generated that is associated with a plurality of video on demand assets, the virtual linear program channel comprising data defining a plurality of predetermined time bins and a forecast number of views of the virtual channel assets within each of the time bins. The virtual linear program channel data is transmitted to a remote scheduling server. Advertising content and linear program channel scheduling instructions are received from the remote scheduling server, the linear program channel scheduling instructions identifying the virtual linear program channel and a selected time bin for insertion of the advertising content. The linear program channel scheduling instructions are translated into scheduling criteria for dynamically inserting the advertising content during playback of any of the virtual channel assets within the selected time bin.

13 Claims, 6 Drawing Sheets

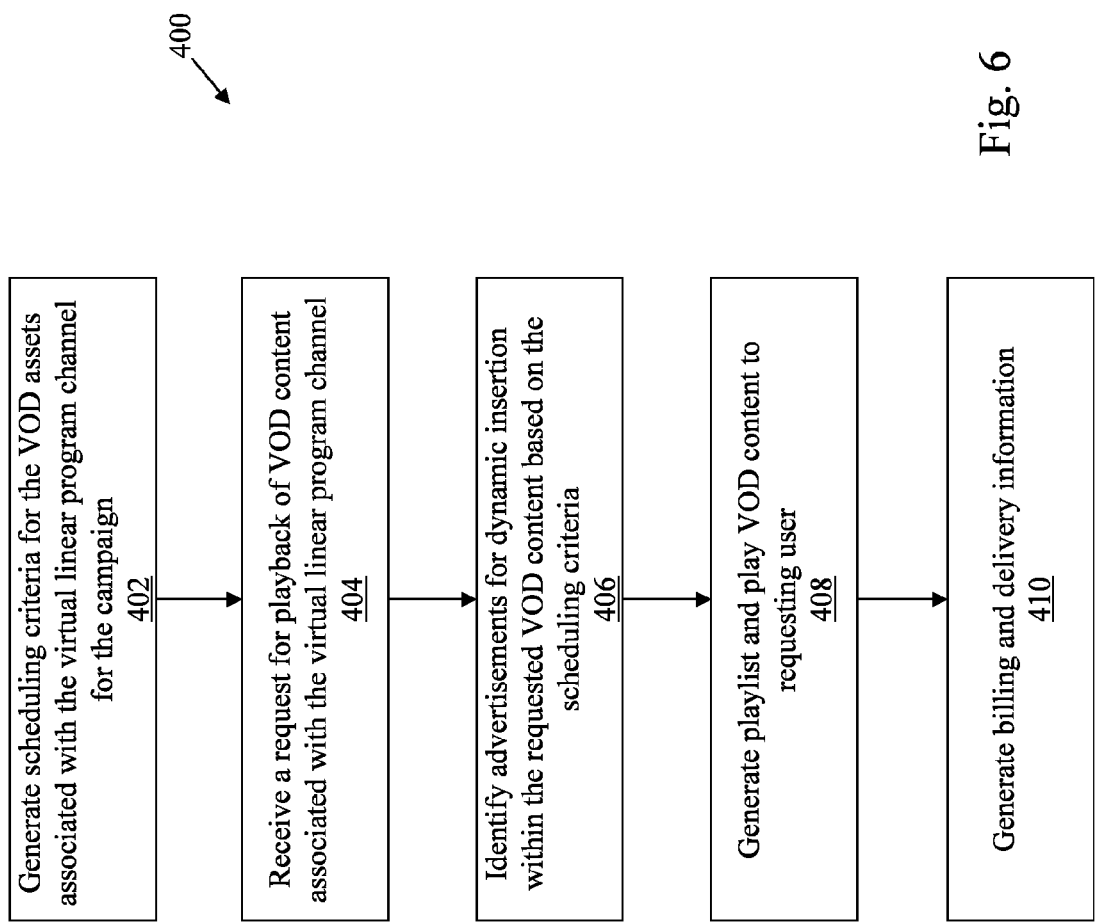

SYSTEM AND METHOD OF SCHEDULING ADVERTISING CONTENT FOR DYNAMIC INSERTION DURING PLAYBACK OF VIDEO ON DEMAND ASSETS

FIELD OF THE INVENTION

The present invention relates generally to computer-based methods and apparatuses, including computer program products, for a system and method of scheduling advertising content for dynamic insertion during playback of video on demand assets.

BACKGROUND

In the U.S., television advertising is considered one of the most effective mass-market advertising formats. Advertising not only provides funding for most privately owned television networks but also serves as a critical tool for companies and businesses to promote products and services. Linear television is broadcast television that has a predefined schedule (e.g., broadcast television over a cable television infrastructure or other embodiment). The majority of television advertisements for linear television consist of brief advertising spots, ranging in length from a few seconds to several minutes. Spot Television ("Spot TV"), for example, is the purchase of commercial time on a market-by-market basis.

Commercial time on linear television is usually sold based on a Cost Per Mille ("CPM") value of the ad spot, where M is the Roman letter representing 1,000. As such, the CPM value of an advertising spot is the cost for the ad to reach approximately one thousand people. However, the nature of linear programming makes it difficult to calculate the actual number of ads and/or impressions delivered on a per ad basis. As a result, certain statistics are needed to estimate the approximate number of viewers of a particular linear television program. Third parties can provide statistical viewership information for linear television programming, which can in turn serve as a baseline for calculating the CPM of an advertising spot. For example, The Nielson Company provides independent audience sampling ("Nielson ratings") based on, for example, national statistics, local statistics, and/or audience statistics. Ads can then be sold to advertising agencies ("ad agencies"), which work with advertisers to create an individualized advertising campaign based on, for example, the advertiser's target audience, preferred number of views, cost factors, desired run time of the ad campaign, and other considerations.

Advertising for Video On Demand ("VOD") has a very different framework compared to linear television. VOD allows viewers to select and request stored video and its accompanying content for presentation at the user's in-home set-top box. Because each VOD presentation is initiated in response to a user request, better viewership statistics are available for VOD advertising that are not available for linear television. As such, VOD advertising is often sold on a cost-per-impression basis. Unlike linear television, VOD advertising can be tracked and quantified at the transaction level for true return on investment. For example, VOD systems can keep viewership statistics such as the geographical area/demographic group of delivery, approximate age group, ad request time, and other detailed ad delivery statistics that are not available for linear ad programming. Advantageously, this allows for targeted VOD ad campaigns based on the desired audience an advertiser wishes to reach.

SUMMARY OF THE INVENTION

The techniques described herein provide methods, apparatuses, and computer program products for scheduling advertising content for dynamic insertion during playback of video on demand assets. Such dynamic insertion facilitates, for example, sales of ads for video on demand asset avails through linear ad sales systems.

In one embodiment, there is a method. The method is for scheduling advertising content for dynamic insertion during playback of video on demand assets. The method includes generating a virtual linear program channel associated with a plurality of video on demand assets, the virtual linear program channel comprising data defining a plurality of predetermined time bins and a forecast number of views of the virtual channel assets within each of the time bins. The method also includes transmitting the virtual linear program channel data to a remote scheduling server. The method also includes receiving advertising content and linear program channel scheduling instructions from the remote scheduling server, the linear program channel scheduling instructions identifying the virtual linear program channel and a selected time bin for insertion of the advertising content. The method also includes translating the linear program channel scheduling instructions into scheduling criteria for dynamically inserting the advertising content during playback of any of the virtual channel assets within the selected time bin.

In a second embodiment, there is a method. The method is for scheduling advertising content for dynamic insertion during playback of video on demand assets. The method includes receiving advertising content and linear scheduling instructions from a remote scheduling server, the linear scheduling instructions identifying a broadcast program channel and a scheduled time for insertion of the advertising content. The method also includes translating the linear scheduling instructions into a virtual linear program channel, the virtual linear program channel being associated with a plurality of video on demand assets having content related to content of the broadcast program channel. The method also includes translating the linear scheduling instructions into scheduling criteria for dynamically inserting the advertising content during playback of any of the virtual channel assets within a selected time bin.

In another embodiment, there is a system. The system is for scheduling advertising content for dynamic insertion during playback of video on demand assets. The system includes a remote scheduling server. The system also includes a gateway in communication with the remote scheduling server. The gateway generates a virtual linear program channel associated with a plurality of video on demand assets, the virtual linear program channel comprising data defining a plurality of predetermined time bins and an expected number of views of the plurality of video on demand assets within each of the time bins. The gateway transmits the virtual linear program channel data to the remote scheduling server. The gateway receives advertising content and linear program channel scheduling instructions from the remote scheduling server, the linear scheduling instructions identifying the virtual linear program channel and a selected time bin for insertion of the advertising content. The gateway translates the linear scheduling instructions into scheduling criteria for dynamically inserting the advertising content during playback of any of the video on demand assets that comprise the virtual linear program channel within the selected time bin.

In a second embodiment, there is a system. The system is for scheduling advertising content for dynamic insertion during playback of video on demand assets. The system includes a remote scheduling server. The system also includes a gateway in communication with the remote scheduling server. The gateway receives advertising content and linear scheduling instructions from a remote scheduling server, the linear scheduling instructions identifying a broadcast program channel and a scheduled time for insertion of the advertising content. The gateway translates the linear scheduling instructions into a virtual linear program channel, the virtual linear program channel being associated with a plurality of video on demand assets having content related to content of the broadcast program channel. The gateway translates the linear scheduling instructions into scheduling criteria for dynamically inserting the advertising content during playback of any of the video on demand assets that comprise the virtual linear program channel within a selected time bin.

In another embodiment, there is a computer program product. The computer program product is tangibly embodied in a computer readable medium. The computer program product includes instructions being operable to cause a data processing apparatus to schedule advertising content for dynamic insertion during playback of video on demand assets. The computer program product includes instructions being operable to cause a data processing apparatus to generate a virtual linear program channel associated with a plurality of video on demand assets, the virtual linear program channel comprising data defining a plurality of predetermined time bins and a forecast number of views of the virtual channel assets within each of the time bins. The computer program product also includes instructions being operable to cause a data processing apparatus to transmit the virtual linear program channel data to a remote scheduling server. The computer program product also includes instructions being operable to cause a data processing apparatus to receive advertising content and linear program channel scheduling instructions from the remote scheduling server, the linear program channel scheduling instructions identifying the virtual linear program channel and a selected time bin for insertion of the advertising content. The computer program product also includes instructions being operable to cause a data processing apparatus to translate the linear program channel scheduling instructions into scheduling criteria for dynamically inserting the advertising content during playback of any of the virtual channel assets within the selected time bin.

In other embodiments, any of the embodiments above can include one or more of the following features. In some examples, a request is received from a subscriber within the selected time bin to playback a virtual channel asset, and the advertising content is dynamically inserted during playback of the virtual channel asset to the subscriber according to the scheduling criteria. Generating the virtual linear program channel can further include defining for each predetermined time bin at least one avail within which to dynamically insert the advertising content according to the scheduling criteria during playback of a virtual channel asset.

In other examples, generating the virtual linear program channel can further comprise defining a plurality of avails across the plurality of predetermined time bins within which to dynamically insert content during playback of a virtual channel asset, wherein a first set of avails is reserved for dynamically inserting the advertising content according to the scheduling criteria translated from the linear program channel scheduling instructions and a second set of avails is reserved for dynamically inserting advertising content according to scheduling criteria received from a manual input.

In some examples, translating the linear program channel scheduling instructions into scheduling criteria further can include translating a selection of a geographic zone within the scheduling instructions into targeting criteria for dynamically inserting the advertising content during playback of any of the virtual channel assets within the selected time bin to subscribers within the selected geographic zone. The virtual linear program channel can be further associated with targeting criteria for targeting an audience to receive the advertising content, and the linear program scheduling instructions can be translated into scheduling criteria for dynamically inserting the advertising content during playback of any of the virtual channel assets within the selected time bin to subscribers satisfying the targeting criteria.

In other examples, the advertising content is dynamically inserted according to the scheduling criteria during playback of any of the virtual channel assets within the selected time bin. Data indicative of the insertion of the advertising content can be collected. One or more verification reports can be generated based on at least one verification criteria from the collected data, the verification criteria comprising actual ad delivery, percentage of ad delivery, system operation, or any combination thereof. The one or more verification reports can be transmitted to a billing system.

In some examples, data associated with playback of the virtual channel assets is tracked, and the forecast number of views of the virtual channel assets within each of the time bins is generated according to the tracked playback data. The linear program channel scheduling instructions can be associated with a national advertising campaign, a regional advertising campaign, a local advertising campaign, or any combination thereof.

In other examples, a remnant virtual linear program channel associated with a plurality of video on demand assets associated with low viewership statistics is generated. Each bin of the predetermined time bins can be representative of a particular video on demand asset and the forecast number of views within each of the time bins can be representative of the forecasted number of views of each particular video on demand asset during a predetermined time period that is greater than a time period of the bin. Translating can include translating the linear program channel scheduling instructions into scheduling criteria for dynamically inserting the advertising content during playback of any of the particular video on demand assets during the predetermined time period associated within the selected time bin.

In some examples, the system also includes a subscriber in communication with the gateway. The gateway can receive a request from the subscriber within the selected time bin to playback a video on demand asset associated with the virtual linear program channel. The gateway can insert the advertising content during playback of the video on demand asset to the subscriber according to the scheduling criteria. The system can also include a subscriber in communication with the gateway. The gateway can receive a request from the subscriber within the selected time bin to playback a video on demand asset associated with the virtual linear program channel. The gateway can insert the advertising content during playback of the video on demand asset to the subscriber according to the scheduling criteria.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 6 is a flow chart showing a conversion process for converting linear scheduling instructions to dynamically insert advertisements into VOD content.

DETAILED DESCRIPTION

In general overview, virtual linear program channels are created to package an estimated number of VOD views and advertising opportunities, or avails, in a manner consistent with linear ad business processes. A view is, for example, a request for a VOD download from a user (e.g., via a VOD server system). The virtual linear program channels, preferably along with forecast information, are transmitted to the remote scheduling server to allow ad agencies to bid on and purchase advertising spots within the virtual linear program channels. Standard linear scheduling instructions are received and parsed to generate scheduling criteria for ads within the VOD advertising opportunities.

Figure 1:
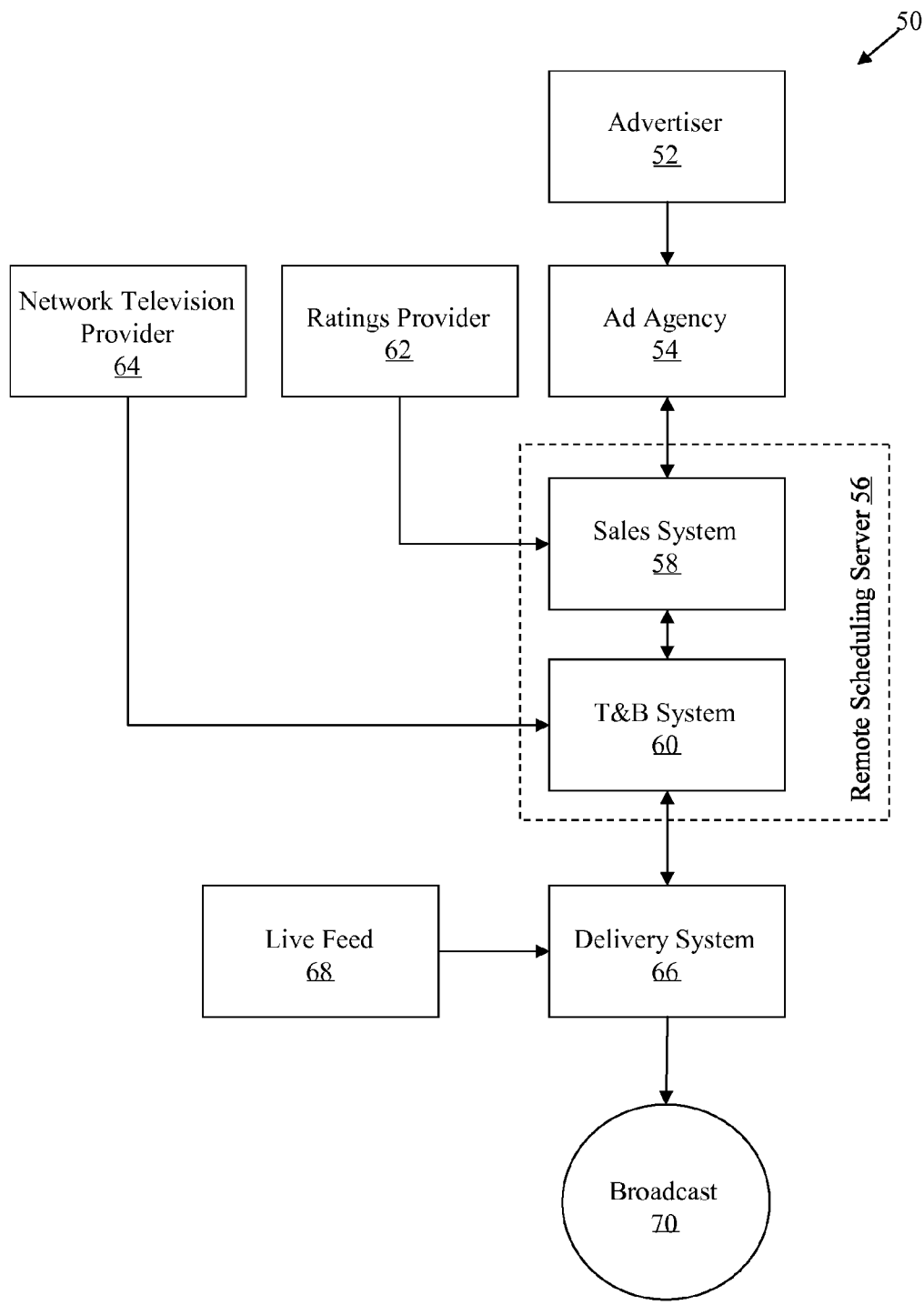
FIG. 1 is a flow diagram showing a linear advertising system for scheduling ads for fixed insertion during playback of linear television programming of the prior art.

FIG. 1 is a flow diagram showing a linear advertising system 50 for scheduling local ads for fixed insertion during playback of linear television programming of the prior art. Scheduling national ads for fixed insertion during playback of linear television programming uses a similar system as that shown in FIG. 1. As shown, the linear advertising system 50 includes an advertiser 52 in communication with an ad agency 54. Advertising ("Ad") agency 54 is in communication with a remote scheduling server 56. Remote scheduling server 56 includes a sales system 58 and traffic and billing ("T&B") system 60. The sales system 58 is in communication with ratings provider 62 (e.g., a Nielson ratings provider). T&B system 60 is in communication with network television provider 64. T&B system 60 is in communication with delivery system 66. Live feed 68 is in communication with delivery system 66. Delivery system 66 transmits broadcast 70 (e.g., to linear television viewers).

Advertiser 52 is a person and/or entity seeking to create an advertising campaign. An advertising campaign reflects the goals and desires that advertiser 52 wishes to accomplish through their advertising strategies. Ad agency 54 is a service business dedicated to creating, planning, and handling advertising for its clients utilizing, for example, Spot TV. The ad agency 54 includes not only the personnel who create the ads, but also the people who meet with advertisers 52 to determine their sales goals and creative strategies. The ad agencies additionally include a buying department which regulates the flow of work in the agency. The ad agencies work with each advertiser 52 to create an advertising campaign, which is a series of advertisement messages that typically share a single idea and theme which make up an integrated marketing communication ("IMC").

Sales system 58 can include one or more server components. Sales system 58 can include, for example, a multi system operator ("MSO") server component that is an operator of multiple cable television systems (e.g., Comcast, Time Warner, and Cox Communications in the US, and Virgin Media in the UK). Commercial ad spot inventory is generated by TV networks. The ad agencies (e.g., Ad agency 54) purchase various combinations and allocations for advertising content (e.g., through both automated and manual means, such as telephone). The inventory includes information such as the content (e.g., which network), viewership information (e.g., Nielsen ratings, which indicate the audience size and composition of television programming), value (e.g., CPM pricing), and/or the like.

T&B system 60 is used to schedule linear advertising. Users can make desired adjustments immediately in the sales system 58 and export orders directly into the T&B system 60. The T&B system 60 generates the linear scheduling instructions based on specific ads. The T&B system can include a traffic scheduler for scheduling the linear advertising. The network television provider 64 provides a schedule of which ads are available to be trafficked by the T&B system 60. The linear schedule then goes into the delivery system 66. The delivery system 66 receives the linear schedule and ads to be inserted, facilitates delivery to linear television users through the delivery network, and transmits verification reports back to the T&B system 60. The delivery system 66 (e.g., using a splicer) splices linear advertising into broadcast streams. The communications from the T&B system 60 to the delivery system 66 (e.g., an ad insertion system) can use ANSI/Society of Cable Telecommunications Engineers ("SCTE") 118-3, which is the traffic system to ad insertion system file format specification. T&B system 60 can include server components that generate the schedules of ads to play and receive information for the verification reports. A linear T&B server component can be used, for example, to obtain asset delivery orders or contracts and billings for asset delivery. At the national level, there is typically an agreement with cable companies, so the process repeats for an amount allocated to the cable company.

Proposal systems, such as DealMaker™ by Invision Inc., are often utilized by media companies for inventory management and pricing of commercial ad time. Such tools can help a media company to make decisions on their advertising sales business. The services offered can include creating proposals and taking deals, generating and managing rate cards (i.e., the audience estimates and pricing for programs), allocate spots to brands according to client specifications, report on avails, units in proposals, units on hold, and units ordered, and other related ad services. Advertising sales systems (e.g., sales system 58) bridge together the contracts between national TV sales reps and major ad agencies to purchase commercial ad time. To streamline the ad sales process, server systems can receive contracts electronically (e.g., via the Electronic Data Interchange (EDI) by Strata Marketing).

Generally, an ad agency 54 works with advertisers 52 to create ad campaigns by purchasing ad spots through the remote scheduling server 56. The ads are purchased, with the value determined through the CPM of the ad spot. After the ad spots are purchased, T&B system 60 generates linear program scheduling instructions based on the network content from the network television provider 64. The T&B system 60 transmits the linear program scheduling instructions to the delivery system 66, which splices the ads into the live broadcast feed from live feed 68. The resulting broadcast 70 is delivered to viewers.

However, while there is great potential to use VOD advertising as part of an overall advertiser's ad campaign, various incompatibilities with linear advertising (e.g., the linear advertising business workflow as used by the components of FIG. 1 for the sales and scheduling of local ads for fixed insertion during playback of linear television programming) make VOD advertising less appealing than standard linear advertising. For example, the current sale processes of linear advertising does not support the sales of VOD ads. Linear television spots can be sold based on Nielson ratings, have guaranteed presentation times, and the ad spots also have known presentation times. Unlike linear television, VOD content are transmitted sporadically based on user requests, there are no guaranteed presentation times, and ad presentation times are unknown. This results in less VOD ad sales, a slower overall process for VOD ad campaign generation, and a hesitancy of linear ad agencies to include VOD ad spots in addition to traditional linear television ad opportunities.

The techniques for scheduling advertising content for dynamic insertion during play of video on demand assets described herein can provide one or more of the following advantages. An advantage to the techniques are ad agencies can purchase advertising through multiple system operators ("MSOs") and/or linear traffic and billing ("T&B") server systems without changing the current ad purchasing process. VOD ad spots (e.g., ad placement opportunities) are translated into a format consistent with linear advertising models. Linear scheduling instructions are translated appropriately without involvement from the MSOs, linear T&B systems, or traffic schedulers. The system can generate accurate delivery reports, which can include specific information related to the number of ads viewed, delivery information, and other heuristics.

Figure 2:
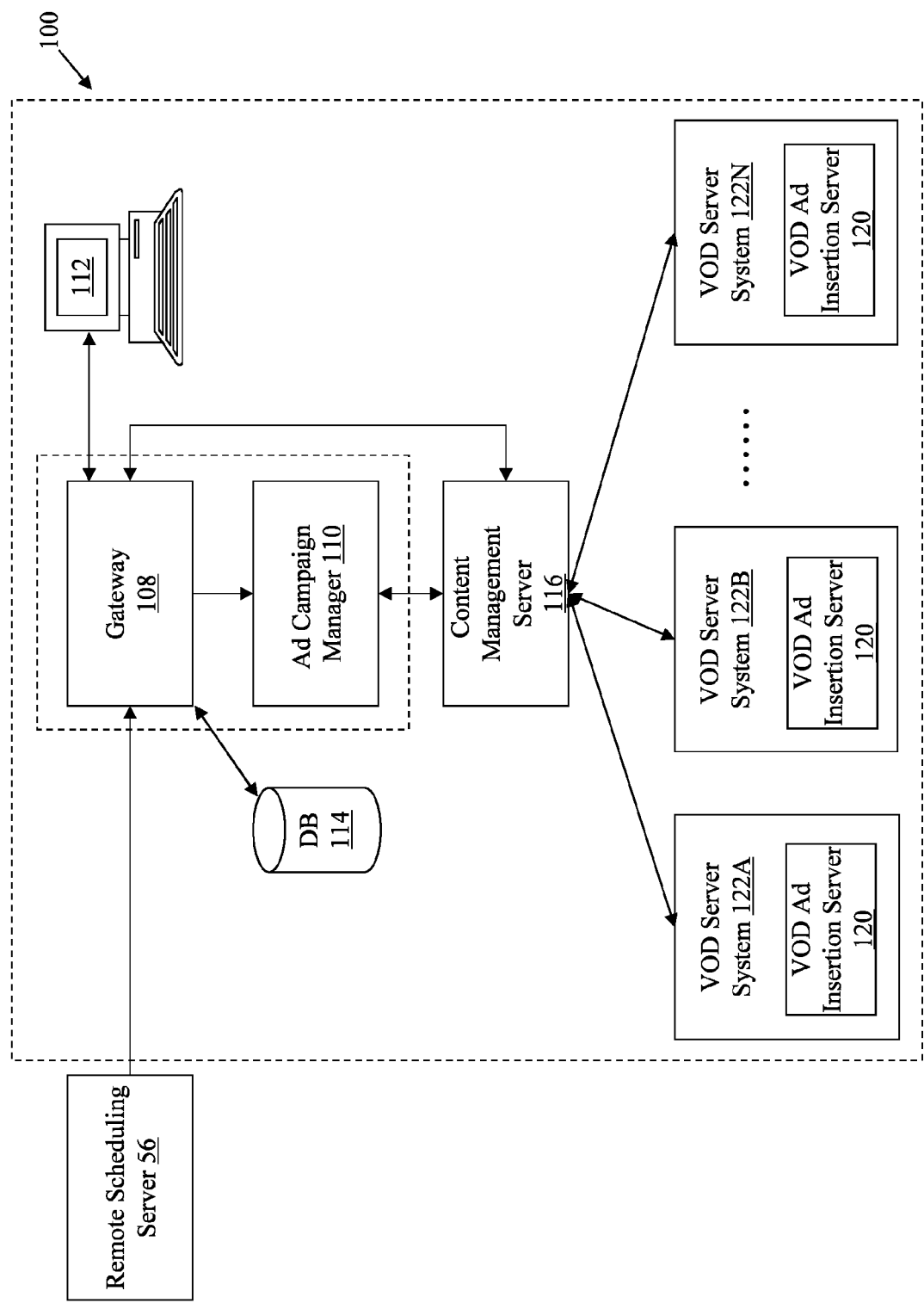
FIG. 2 is a diagram showing a VOD system for scheduling advertising for dynamic insertion during playback of VOD assets according to one embodiment.

FIG. 2 is a diagram showing a VOD system 100 for scheduling advertising for dynamic insertion during playback of VOD assets according to one embodiment. As shown, VOD system 100 is in communication with the remote scheduling server 56 through a gateway 108. Gateway 108 is in communication with ad campaign manager 110, terminal 112, and database 114. Content management server 116 is in communication with ad campaign manager 110 and gateway 108. Content management server 116 is in communication with VOD server system 122A through VOD server system 122N (collectively VOD server systems 122). Each VOD server system 122 includes an ad insertion server 120.

The remote scheduling server 56 can be any standard linear advertising sales server system. For example, as discussed in FIG. 1, the remote scheduling server 56 can include the sales system 58, the T&B system 60, or any combination thereof. Gateway 108 facilitates communications between the remote scheduling server 56 and the VOD system components (e.g., the ad campaign manager 110, content management server 116, etc.) The ad campaign manager 110 can facilitate the use of more targeted advertising for certain advertisers. The ad campaign manager 110 can be separated from and/or functionally incorporated into other modules such as the gateway 108. The VOD ad insertion server 120 can be, for example, an AdPulse VOD system developed by SeaChange International Inc. of Acton, Mass., which provides extensions to core VOD technology and the ad management functions that automate the dynamic insertion of advertisements into VOD streams. The AdPulse VOD system includes, for example, ad campaign manager 110, content management server 116, and VOD ad insertion servers 120.

VOD server systems 122 can include, for example, a content delivery platform. For example, the content delivery platform can be an Axiom™ On Demand™ system by SeaChange International Inc. For example, the content delivery platform can automate the intensive behind-the-scenes VOD processes including content propagation, subscriber and stream management, and performance reporting and monitoring. The VOD server system 122 software can also provide the foundation for adding additional content navigation, gaming, DVD and ad targeting applications. Ad content delivery can be, for example, provided from a tape, a video file, and/or the like.

In some embodiments, instead of representing a linear insertion opportunity, an avail represents an inventory package. An inventory package is salable to a buyer, and includes one or more attributes (e.g., show placement location, audience forecast, and/or cost). For linear ad sales (e.g., Linear Spot), an inventory package includes opportunities and/or information advertisers traditionally use for ad purchasing (e.g., an insertion opportunity in a specific point in the timeline of a show, with an associated Nielsen forecast and a CPM). For non-linear insertion opportunities (e.g., VOD), the inventory package can represent a placement opportunity for an asset (e.g., an avail), an audience forecast for a bin based on VOD system reports, and a CPM. For example, assume a re-run of a broadcast show is available on VOD with three avails. Audience forecasts can be generated for periods (e.g., one hour periods) in which the content will be available (e.g. 10,000 viewer between 8:00 p.m. and 9:00 p.m. on a given date, etc.). A price can be set for the inventory package. This translates to an inventory package with three avails scheduled some time between 8:00 p.m. and 9:00 p.m., with an audience forecast of 10,000.

Figure 3:
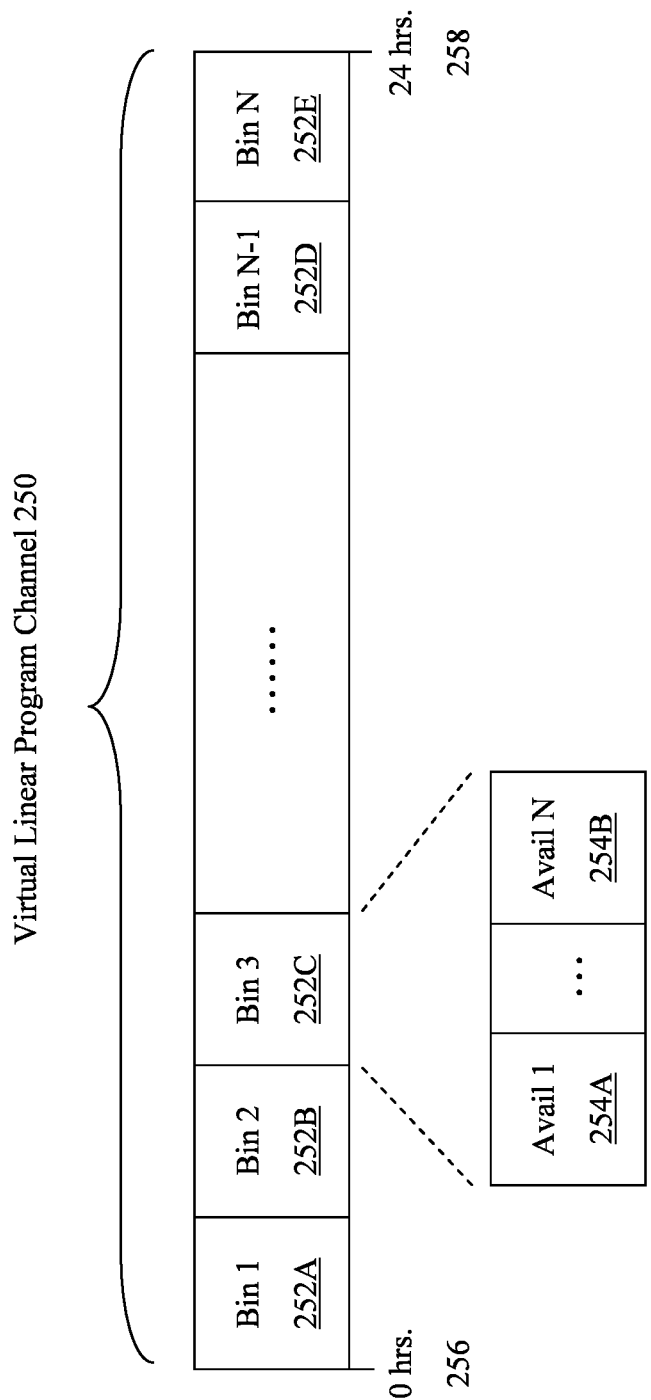
FIG. 3 is an exemplary diagram representing a virtual linear program channel for VOD assets according to one embodiment.

FIG. 3 is an exemplary diagram representing a virtual linear program channel 250 for VOD assets according to one embodiment. As shown, the virtual linear program channel 250 includes data that defines a plurality of predetermined time bins, bin one 252A through bin N 252E (collectively bins 252). Each of the bins 252 includes data defining one or more avails, avail one 254A through avail N 254B. Each avail is an ad placement opportunity within the represented VOD content. Virtual linear program channel 250 spans a time period from zero hours 256 to twenty four hours 258.

For example, each day can be broken out into a number of bins for a virtual linear program channel. Each bin has a number of virtual channel avails associated with it. In some examples, there is one avail per bin. Bins represent a block of time for which avails can be sold. Each bin can be set to span a specific amount of time, such as one hour, two hours, and/or the like. The bins can be configured to represent variable time slots based on other criteria, such as desired CPM, predicted number of views, and/or the like. For example, VOD assets can be grouped to represent a consistent number of predicted views (e.g., bins representing 10K view slots).

Each bin is preferably associated with forecast data indicative of the number of expected views of the VOD content of the bin. For example, if a particular bin is associated with content from three different VOD assets (e.g., virtual channel assets), the expected number of views of the three different assets can be added together to generate the expected number of views. The actual number of views of a particular VOD asset can be recorded over time and used to develop estimates of the expected number of views of the VOD asset during a particular time period. For example, statistics can be recorded for a VOD asset during the hours of 8:00 p.m. to 10:00 p.m. The statistics can be averaged together to generate an estimated number of views of the VOD asset during the 8:00 p.m. to 10:00 p.m. timeslot.

Figure 4:
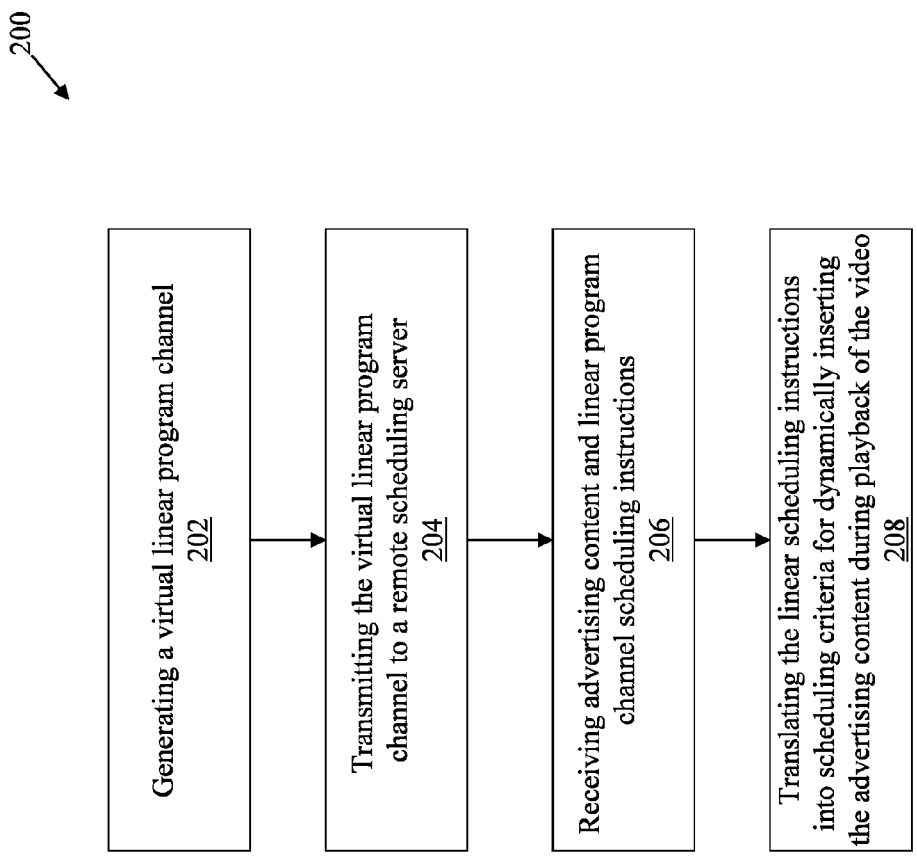
FIG. 4 is a flow chart showing a method of scheduling advertising content for dynamic insertion during playback of VOD assets according to one embodiment.

FIG. 4 is a flow chart showing a method 200 of scheduling advertising content for dynamic insertion during playback of VOD assets according to one embodiment. At 202, gateway 108 generates a virtual linear program channel associated with a plurality of video on demand assets from the content management server 116. At 204, gateway 108 transmits the virtual linear program channel data to the remote scheduling server 56. The remote scheduling server uses the virtual linear program channel data in the same manner as standard linear program channel data for broadcast programming, returning advertising and linear program channel scheduling instructions. At 206, gateway 108 receives advertising content and linear program channel scheduling instructions (e.g., for linear television or for a particular ad campaign) from the remote scheduling server 56. At 208, gateway 108 parses the linear program channel scheduling instructions into tokens and/or parameters and translates the tokens and/or parameters representing the linear program channel scheduling instructions into scheduling criteria for dynamically inserting the advertising content during playback of any of the virtual channel assets within the selected time bin.

In more detail with respect to step 202, the creation of the virtual linear program channel can be done manually, based on the VOD assets, in response to linear programming instructions from the remote scheduling server 56, as a remnant channel (described below), and other methods. The gateway 108 not only creates the virtual linear program channels, but can also package information which can further include metadata. Gateway 108 provides the virtual linear program channels and the metadata to the remote scheduling server 56 (e.g., to the sales system 58).

The sales system 58 can set up the next day's schedule based on the actual number of VOD ad deliveries (e.g., via statistics from the VOD server systems 122). For example, if an advertiser 52 only paid for 10K views for an avail, but the avail is receiving 20K views, the additional views can be sold for another ad campaign (e.g., to an ad agency 54). Linear television does not have such a problem because there is no efficient way to measure the actual number of viewers. The VOD system can be configured, for example, to allow ad deliveries above and/or below the forecast to average out over time, and thus higher views can compensate for lower views. For example, criteria for verification can be based on whether the ad asset was available for delivery and the delivery system was successfully delivering ads. If so, then the ad delivery is deemed successful. Advertising can also be deemed to be delivered if a minimum percentage of contracted ad views (e.g., 10%) are actually delivered.

For step 202, the terminal 112 can be used as a manual interface to the gateway 108 and/or the ad campaign manager 108 to change virtual linear program channel definitions as necessary. For example, the terminal 112 can be used to define linear virtual program channels, which are stored in the database 114. Terminal 112 can include a user interface for defining the virtual linear program channel definitions. For example, a user can interact with the gateway through the user interface to define the virtual linear program channel, including the length of the bins, the number of avails, the content for each bin, and other In further detail with respect to step 202, gateway 108 queries content management server 116 for VOD groupings and assets. Gateway 108 also queries content management server 116 for viewership statistics of the VOD assets. Viewership information can be retrieved from the VOD server systems which stores views (e.g., VOD server systems 122). Campaign details can be, for example, all movies in folder A of a particular VOD system. Advantageously a schedule and viewership data can be used to generate the equivalent of the previous linear system through channel definitions, well-defined schedules, and views.

For step 202, to preserve the linear advertising methodology, each avail of the virtual linear program channel can be associated with an ad presentation time. For example, the first avail can be associated with an ad presentation time of 7:05 p.m., or five minutes into the presentation of the virtual linear program channel. The second avail can be associated with, for example, a presentation time of 7:30 p.m., or halfway through the presentation of the virtual linear program channel. As with creating the virtual linear program channel, there may not be a guaranteed presentation time of either avails, and thus the ad content may not be presented at the exact time specified by the avail. However, the avails provide an approximate ad presentation time (e.g., to the remote scheduling server 56). The avails can have different CPM values based on the estimated ad play time, the estimated viewership information, and other ad data.

In further detail for step 202, in some embodiments a remnant channel can be created for VOD asset ad opportunities. While some ad criteria may overlap (e.g., age group of 18-25 that are males), some may not match at all. A remnant channel can be used to sell ads for these bins so there is no blank space in the VOD playback for an unfilled avail. These remnant ad spaces can be associated with a lower CPM value than other avails. In some embodiments, the advertising bins can be split up so a portion of the advertising bins are sold based on ad sales to advertisers (e.g., via translations to and from the remote scheduling server 56 for VOD advertising), while a portion are reserved for advanced campaigns. It may be beneficial to continue to provide targeted campaign opportunities for VOD advertising to meet specific targeting needs for advertisers. For example, for a VOD channel with 150K views, the system can sell 100K to traditional advertisers while reserving 50K for advanced campaigns (e.g., targeted campaigns). The remnant channels can be manually added through a user interface at terminal 112.

In more detail with respect to step 204, the remote scheduling server 56 receives data indicative of the virtual linear program channel (see, e.g., FIG. 3), which is in a format generally understood by the remote scheduling server 56. For example, gateway 108 can communicate with the remote scheduling server 56 via ANSI/SCTE 118 or by using Cable Computerized Management Systems (CCMS) schedule formats. Other standards and/or formats can be used to communicate with the remote scheduling server 56.

In more detail with respect to step 206, once the avails are sold (e.g., purchased by ad agency 54 via interactions with the MSO or Linear T&B of the remote scheduling server 56), a traffic schedule is delivered (e.g., via T&B system 60 of the remote scheduling server 56). Ads can be separate from the VOD programming content until playout and tracked uniquely. At playout ads are spliced into VOD content; the VOD ad insertion server 120 handles the splicing of ads into the VOD content. The VOD ad insertion server 120 receives schedules which are used to automatically determine the video required and to request appropriately (e.g., from a video server). The gateway 108 can use the linear schedule file from the remote scheduling server 56. Ad ingest can include, for example, importing an ad asset from a network share through a transcoder, third party generated MPEG and ADI 1.1 or ADI 2.0 files, and/or by manual entry via an ad meta data editor ("ADME" by SeaChange International Inc.) of an MPEG file.

In more detail with respect to step 208, gateway 108 can transmit scheduling criteria (e.g., all files in a particular folder, folder A, for a stream requested between 8 p.m. and 9 p.m.) to the content management server 116. For example, gateway 108 can transmit campaign details using SCTE 130 or Campaign Information Package (CIP) by CableLabs, which creates the framework to pick, on the fly, which ad, and of which length, to splice into a stored program. CIP provides configuration details for MSO systems, delivery instructions for content assets, identifiers for resolving metrics and application messages, addresses for propagation of messages and delivery of measurement data, and other necessary data. CIP can be used to drive the advertising and non-advertising campaign execution process. The database 114 can be used to store the virtual linear program channels and/or the forecast data used by the gateway 108. The content management server 116 controls and decides what content will be live and how to use the ad insertion criteria to insert ads into the VOD content at appropriate avails.

Virtual channels can be created to represent groupings of VOD assets based on genre, VOD provider (e.g., ESPN, CNN, etc.), VOD presentation time, and/or other types of grouping criteria. For example, a virtual linear program channel can be created for the genre "Asian karate," set up to represent a one hour show with two advertising opportunities that repeat twenty-four times a day. However, unlike linear television there is not a guaranteed playback time of the Asian karate VOD assets. To adjust VOD programming into the linear television model, viewership statistics can be used to estimate how many VOD subscribers will be likely to request the VOD content during a specified time block.

Viewership statistics for the desired time period are used to estimate the probable number of views for the Asian karate virtual linear program channel. For example, assume viewership statistics dictate approximately 1,000 views of various Asian karate VOD assets occur between 7:00 p.m. and 8:00 p.m. on Tuesday nights. The associated Asian karate VOD assets can be grouped (e.g., by gateway 108) into the virtual linear program channel with one bin (e.g., bin one 252A) between 7:00 p.m. and 8:00 p.m. with two advertising opportunities (e.g., two avails within bin one 252A).

The gateway 108 transmits to the remote scheduling server 56 information indicative of what the different ad opportunities are for the Asian Karate virtual linear program channel, which content the ad opportunities are inserted into, and when the ads can be inserted. To the remote scheduling server 56, the virtual linear program channel appears like any other linear program channel. Advantageously, the gateway 108 translated discrete viewership opportunities of VOD content into an equivalent representation to mimic linear advertising opportunities. As a result, the avails (e.g., ad opportunities) are sold for the virtual linear program channel as they would be sold for normal linear ad opportunities.

Once the Asian karate avails are sold, the linear scheduling instructions can be translated into scheduling criteria to dynamically insert a first ad (e.g., from the advertising content transmitted by the remote scheduling server 56) within the first five minutes of a VOD asset playback. Similarly, the scheduling criteria can dynamically insert a second ad within the first thirty minutes of the VOD asset playback. For example, to the remote scheduling server 56, the gateway 108 can transmit a virtual linear program channel including one avail within the first 20 min of a show. Similarly, a virtual linear program channel can indicate at 8:10 p.m. there are two insertion opportunities, thirty seconds each. Such advertising spots are pertinent for spot linear but are not used for VOD. Further, 8:10 is also irrelevant for VOD, but can be used to distinguish between different ad insertion opportunities. The time can translate, for example, to scheduling instructions to insert the ad into any VOD content initiated between 8:00 p.m. and 10:00 p.m. Thus, rather than purchasing an advertisement time spot, the advertiser is purchasing a stream of uses. Statistics can be propagated back up to gateway 108 to indicate whether the ads were shown or not. Such statistics can be indicative of a binary result, a percentage played, and/or the like.

Thus, ad hoc creation of virtual linear program channels enables the sale of ads for the known associated VOD content. The gateway 108 allows the remote scheduling server 56 to identify ad opportunities within VOD assets without modifying any of the underlying hardware and/or software currently being used by the system since the virtual linear program channel is in a structure that is compatible with the current operation of the remote scheduling server 56. Similarly, the traditional linear scheduling instructions generated by the remote scheduling server are parsed and translated into the scheduling criteria for dynamically inserting the ad content into the VOD assets during playback.

The system returns information (e.g., delivery information) back up the chain for billing purposes. Additionally, additional reports and analytics can be generated (e.g., through the content management server 116). Reporting is useful to give advertisers feedback. Because the actual presentation of ad content in VOD is specifically tied to a particular VOD asset request, detailed statistics can be obtained from the ad presentation. For example, information such as the exact ad playback timestamp, the number of ads actually presented, and other requester statistics (e.g., geographical area, age group, etc.) can be recorded and used for reporting purposes.

Alternative billing schemes can charge advertisers by the actual delivery. For example, the viewership can be divided into multiple bins, and the bins can be audited periodically to determine which bins were successful based on actual VOD delivery. For example, assume a SciFi virtual channel at 9 p.m. to 10 p.m. on a Friday night slot, which is associated with a forecasted 120K views. Multiple avails can be created, one with a forecast of 90K viewers, one with 30K viewers, and one with 10K viewers. If only 100K views were delivered, then only the 90K view and the 10K view avails are verified. If, for example, 130K views were delivered, all three avails are verified.

Advantageously, method 200 provides a way to seamlessly provide VOD ad opportunities to linear advertising systems (e.g., remote scheduling server 56) for promoting VOD ad sales without disrupting the existing linear ad sales methodology. VOD assets can be grouped and/or utilized in ways which mesh with the remote scheduling server 56 to promote the same interactions with the ad agency 54. For example, while VOD ad avails allow for targeted ad campaigns, the gateway 108 can ignore these capabilities and instead provision the VOD inventory into the linear ad sales process.

By following the standard linear sales business process, the VOD inventory and ad insertion is promoted by gateway 108. Sales are executed in traditional manners by the linear advertising system. The sales are entered, confirmed, and scheduled (e.g., by T&B system 60). Based on the schedule, advertising content can be ingested and/or transcoded into video assets (e.g., via a transcoder). Transitioning the scheduling information back into the VOD system operates seamlessly with gateway 108 translating the linear schedule file into VOD campaign instructions. Additional targeting instructions (e.g., creative versioning) can be added to the campaign. Delivery data can be collected and delivered into data reports, which can allow gateway 108 to generate verification files. The gateway 108 can transmit the verification files back to the sales system 58. In turn, the sales system 58 can generate invoices for customers. Invoices can be delivered to customers (e.g., via a computerized data interchange).

Figure 5:
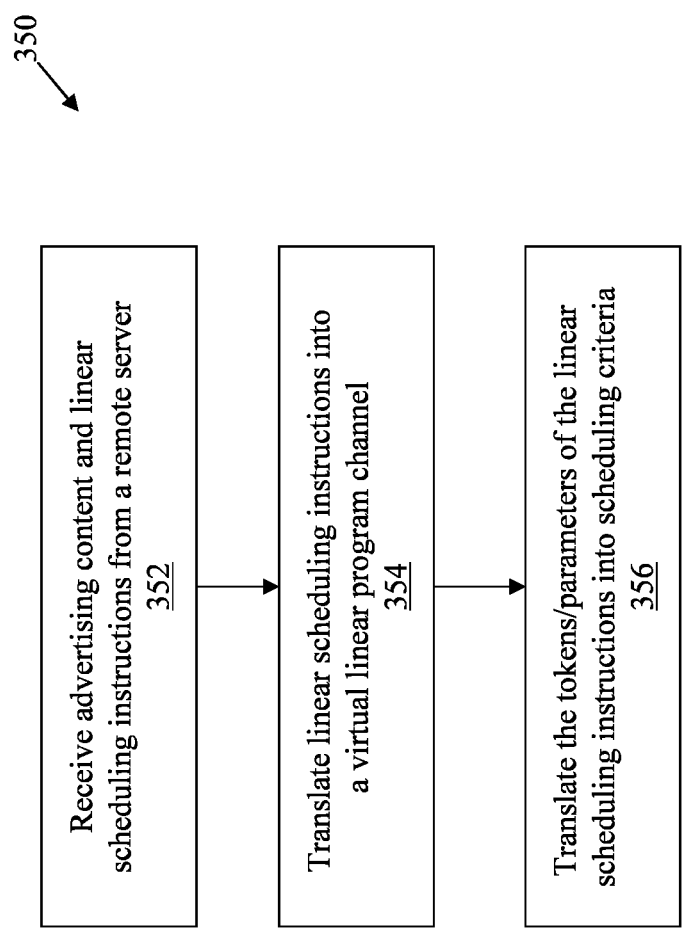
FIG. 5 is a flow chart illustrating a method of scheduling advertising content for dynamic insertion during playback of VOD assets according to another embodiment.

FIG. 5 is a flow chart 350 illustrating a method of scheduling advertising content for dynamic insertion during playback of VOD assets according to another embodiment. At 352, the gateway 108 receives advertising content and linear scheduling instructions from the remote scheduling server 56. The linear scheduling instructions identify a broadcast program channel and a scheduled time for insertion of the advertising content. At 354, the gateway 108 translates the linear scheduling instructions into a virtual linear program channel (e.g., virtual linear program channel 250). The virtual linear program channel is associated with a plurality of video on demand assets that have content related to the content of the broadcast program channel. At 356, the gateway 108 parses the linear scheduling instructions into tokens/parameters representative of the content of the linear scheduling instructions and translates the linear scheduling instructions into scheduling criteria for dynamically inserting the advertising content during playback of any of the virtual channel assets within a selected time bin.

In more detail with respect to steps 352 and 354, rather than creating the virtual linear program channel before scheduling by the remote scheduling server 56, the virtual linear program channel can be derived by decoding and interpreting the linear scheduling instructions generated by the remote scheduling server 56. For example, an advertiser may desire to sell ads both on a linear channel of a particular content provider (e.g., ESPN) as well as with VOD assets associated with the content provider (e.g., archived sports videos, highlight videos, etc.). For example, assume a content provider purchases an ad campaign including an ad spot for a football game starting at 1:00 p.m. and ending at 4:00 p.m., and also for a VOD ad spot for sports highlights during the same timeframe. This can allow any ad placed on a live/linear channel to also be dynamically placed in related VOD content requested during the same timeframe. Advantageously, both linear television viewers and VOD viewers would see the same advertisement, extending the ad campaign to a broader audience (e.g., by listening to the linear scheduling instructions for ESPN and create a VOD campaign based on the schedule).

For example, the sales system 58 can sell four ad spots on ESPN between 8:00 p.m. and 9:00 p.m., where spots two and four are for VOD ad spots. To determine the sale value, assume for purposes of this example the particular rating for the ESPN broadcast channel is 100K views for the desired one hour time period, while statistics show 20K will watch VOD content related to the broadcast channel. An advertiser can purchase just the 100K views on the broadcast channel, or the advertiser can purchase both the broadcast and VOD advertising spots to reach 120K views. If the advertiser (e.g., via their associated ad agency) purchases the 120K views, the gateway 108 creates a virtual linear program channel based on the linear scheduling instructions (e.g., from the remote scheduling server 56). The linear scheduling file can include, for example, notes so the gateway 108 can parse the linear scheduling file and determine to create the channel. Additionally, the linear scheduling instructions are translated into scheduling criteria (e.g., via the gateway 108 and content management server 106). The scheduling criteria make sure the ad plays part of VOD assets within the created virtual linear program channel, regardless of the actual content of the assets.

FIG. 6 is a flow chart showing a conversion process 400 for converting linear scheduling instructions to dynamically insert advertisements into VOD content. With reference to FIG. 2, at 402 the ad campaign manager 110 generates scheduling criteria for the VOD assets associated with the virtual linear program channel for the campaign. At 404, the content management server 116 receives a request for playback of VOD content associated with the virtual linear program channel (e.g., from a VOD server system 122). At 406, the content management server 116 identifies advertisements for dynamic insertion within the requested VOD content based on the scheduling criteria. At 408 the content management server 116 generates a playlist and plays the requested VOD content to the requesting VOD server system 122. At 410, the VOD server system 122 and/or content management server 116 generates billing and delivery information.

In more detail with respect to steps 404 and 406, VOD asset playback is in response to a request for playback of VOD content from a user. The content management server 116 determines whether the requested VOD asset is associated with a particular virtual linear program channel. For example, if the request is for an Asian karate movie, the content management server 116 will identify the appropriate ad for dynamic insertion as instructed by the scheduling criteria. During playback of the VOD content to the requesting viewer, the ads are dynamically inserted into the VOD stream (e.g., via a splicer).

In more detail with respect to step 408, the advertising content can be stored at the content management server 116. There can be an ad asset ingest control to ensure ads are inserted into the VOD content properly. The scheduling criteria for the VOD assets can be, for example, criteria to place a particular ad X on all assets with a content provider tag (e.g., ESPN). The scheduling criteria can also include criteria to place a particular ad on a group of assets associated with the virtual linear program channel for which the advertiser purchased the avail. For example, if the virtual linear program channel was for Asian karate, all VOD assets requested during the associated playback time of the virtual linear program channel will be scheduled to include the ad.

In more detail with respect to step 410, verification files can be generated on a recurring bases to drive customer (e.g., advertiser) billing. The VOD server system 122 and/or content management server 116 can generate billing and delivery information based on the recorded delivery information. Various billing schemes can be implemented (e.g., bill only per ad delivery, bill for entire avail if a percentage of the predicted ad views are reached, etc.). For example, as long as 50% of the promised ads were viewed for a particular avail, the VOD ad delivery for the avail is considered to be successful.

Since virtual linear program channels can be created dynamically (e.g., FIG. 5 and the associated description), the channels can be created to represent different types of VOD assets and ad campaign desires. Virtual linear program channels can be created based off a VOD inventory group. Virtual linear program channels can be created to link linear programming ads to VOD network extras and/or network replays (e.g., FIG. 5 and the associated description). For example, a virtual linear program channel can be focused on content associated with a particular base VOD program. A VOD program, for example, may be associated with various language versions, a subtitled version, a director's comment, censored/edited versions, different re-runs, etc. Virtual linear program channels can be created for a special events channel (e.g., a holiday channel).

Advertisers may want to buy avails for specific VOD assets or shows, or buy a general category of VOD assets. Specific VOD assets or shows can be, for example, individual movies, premium television series (e.g., series for HBO, Showtime, etc.), and/or the like. General categories of VOD assets include, for example, VOD assets grouped into categories such as Kids, Family, Action, Drama, and other categories. The general categories can be further subdivided to form more specific virtual linear program channels, such as, for example, Drama One, Drama Two, and Drama Three, where each subset represents a sub-grouping of the more general category, and so on.

To support linear channels for each VOD asset or show, a virtual linear program channel can be created for each VOD asset. For example, a virtual linear program channel can be created with twenty-four bins, each bin with one or more avails, and where each of the twenty-four bins is representative of the same VOD asset. Each bin would additionally be associated with forecast data for the particular VOD asset during the time period represented by the bin. As another example, one virtual linear program channel can be created which includes one bin, the bin comprising one or more avails, and where the bin is representative of a particular playback time of the VOD asset (e.g., from 9:00 p.m. to 10:00 p.m.).

The VOD system 100 can require a program instead of show buy for a minimum of a particular time period (e.g., a whole day twenty-four hour period, a twelve hour period, etc.) when purchasing ads for a specific VOD show, resulting in the creation of a virtual linear program channel for specific shows. For example, for a virtual linear program channel, each bin is an hour in length and represents a particular VOD show, where each bin includes an ad avail for the VOD show. Purchasing an avail for a particular bin can result in scheduled bins for the VOD show for the entire day. Each bin includes forecast data representative of the VOD show over the predetermined time period. For example, if the predetermined time period is a twenty-four hour time period, the bin includes forecast data of the VOD show over the entire predetermined time period.

For example, assume a virtual linear program channel is created for twenty-four shows and allows a purchaser to schedule ads for a minimum of a twenty-four hour period for each show. The virtual linear program channel includes twenty four bins, where each bin represents an "hour" time slot for a particular VOD show and each bin has one ad avail 254. Bin one 252A represents VOD show one, bin two 252B represents VOD show two, and so on up to bin twenty-four which represents VOD show twenty-four. Each bin is associated with forecast data for the VOD show over the entire twenty-four hour period, even though the bin is representative of the VOD show for one hour. If an advertiser purchases the avail for bin one, which represents VOD show one, the advertiser has effectively purchases ads for the entire day (i.e., twenty-four hour period) for VOD show one, at a price commensurate with the forecasted views of VOD show one for the entire twenty-four hour period. Any number of bins and/or avails can be used to represent the VOD assets or shows, and any time period can be used for scheduling the ads. For example, the virtual linear program channel can include twenty-four shows in twenty-four one hour bins, forty-eight shows in forty-eight half hour bins, and/or the like. The system can require virtual linear program channel purchases for a minimum of a twenty-four hour period, twelve hour period, six hour period, and/or the like.

Because of the additional statistical information that can be recorded through VOD advertising (e.g., the actual number of ad views), each avail can be sold to any number of advertisers to fill the expected number of views. For example, if an ad is sold for an avail with an estimated 2K views, but records show the avail is actually getting 3K views, the additional 1K views can be sold to a second advertiser. Thus, in some examples the VOD system can sell a number of views for the avail rather than exclusive use of the avail. While the number of views is returned after delivery (e.g., to the sales system 58), the T&B system 60 doesn't care about the number of views. For each advertiser, they purchase the ad over a predetermined period, not the specific ad so the system can adjust the content at the T&B system 60 to optimize revenue. Thus, a virtual linear program channel with three avails can be sold as having three ad spots. The T&B system 60 updates the schedule, which actually allocates a timeslot.

An advertiser may wish to purchase ad avails of VOD assets to get full coverage of the VOD asset and/or the entire virtual linear program channel. For example, assume a virtual linear program channel 250 from 8:00 p.m. to 9:00 p.m. has three bins 252, bin one with two avails 254 at 8:10 p.m., bin two with two avails 254 at 8:30 p.m., and bin three with one avail 254 at 8:50 p.m. For full coverage of the entire virtual linear program channel, an advertiser may want to purchase the first avail of the first two bins and the single avail of the last bin.

Advantageously, the sales model used to sell ads in the VOD content represented by the linear virtual program channel is already a proven advertising concept. Additionally, the system can scale from the local level to the national level. For example, VOD ad avails can be scheduled nationally and sent out to all local areas. Targeted dynamic VOD ads can be sold with minimal workforce training, and with minimum changes to existing linear advertising business processes. Additionally, establishing a seamless interconnect between linear advertising and VOD advertising can provide an evolution path for better use of targeted advertising.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of scheduling advertising content for dynamic insertion during playback of video on demand assets, comprising:

generating, by a data processing apparatus, schedule and viewership data representing a predefined playback schedule for a virtual broadcast program channel associated with one or more video on demand assets, the predefined schedule comprising a plurality of predetermined time bins spanning a number of hours, the predefined schedule identifying a forecast number of expected views of the virtual channel assets during each of the time bins and at least one avail for each of the time bins;

transmitting, by the data processing apparatus, the predefined schedule of the virtual broadcast program channel to a remote scheduling server in a format used by the remote scheduling server for performing manual advance scheduling of advertising content insertion in avails of broadcast program channels, the predefined schedule being transmitted to the remote scheduling server to manually schedule advertising content for insertion in the at least one avail for each of the time bins of the virtual broadcast program channel prior to playback of the one or more video on demand assets;

receiving, by the data processing apparatus, the advertising content and broadcast program channel scheduling instructions from the remote scheduling server, the broadcast program channel scheduling instructions identifying the virtual broadcast program channel and a selected avail within a selected time bin for insertion of the advertising content; and translating, by the data processing apparatus, the broadcast program channel scheduling instructions into scheduling criteria for dynamically inserting the advertising content during playback of any of the virtual channel assets initiated within the selected time bin.

2. The method of claim 1, further comprising:

receiving, by the data processing apparatus, a request from a subscriber device within the selected time bin to playback a virtual channel asset; and dynamically inserting, by the data processing apparatus, the advertising content during playback of the virtual channel asset to the subscriber device according to the scheduling criteria.

3. The method of claim 1, wherein generating the schedule and viewership data for the virtual broadcast program channel further comprises defining, by the data processing apparatus, a plurality of avails across the plurality of predetermined time bins within which to dynamically insert content during playback of a virtual channel asset, wherein a first set of avails is reserved for dynamically inserting the advertising content according to the scheduling criteria translated from the broadcast program channel scheduling instructions and a second set of avails is reserved for dynamically inserting advertising content according to scheduling criteria received from a manual input.

4. The method of claim 1, wherein translating the broadcast program channel scheduling instructions into the scheduling criteria further comprises translating, by the data processing apparatus, a selection of a geographic zone from the scheduling instructions into targeting criteria for dynamically inserting the advertising content during playback of any of the virtual channel assets initiated within the selected time bin to subscribers within the selected geographic zone.

5. The method of claim 1, wherein the schedule and viewership data for the virtual broadcast program channel is method further comprises translating, by the data processing apparatus, the broadcast program channel scheduling instructions into the scheduling criteria for dynamically inserting the advertising content during playback of any of the virtual channel assets initiated within the selected time bin to subscribers satisfying the targeting criteria.

6. The method of claim 1, further comprising:
dynamically inserting, by the data processing apparatus, the advertising content according to the scheduling criteria during playback of any of the virtual channel assets initiated within the selected time bin;
collecting, by the data processing apparatus, data indicative of the insertion of the advertising content;
generating, by the data processing apparatus, one or more verification reports based on at least one verification criteria from the collected data, the verification criteria comprising actual ad delivery, percentage of ad delivery, system operation, or any combination thereof; and
transmitting, by the data processing apparatus, the one or more verification reports to a billing system.

7. The method of claim 1 further comprising:
tracking, by the data processing apparatus, data associated with playback of the virtual channel assets; and
generating, by the data processing apparatus, the forecast number of views of the virtual channel assets within each of the time bins according to the tracked playback data.

8. The method of claim 1 wherein the broadcast program channel scheduling instructions are associated with a national advertising campaign, a regional advertising campaign, a local advertising campaign, or any combination thereof.

9. The method of claim 1 further comprising generating, by the data processing apparatus, a remnant virtual linear program channel associated with a plurality of video on demand assets associated with low viewership statistics.

10. The method of claim 1 wherein each bin of the predetermined time bins is representative of a particular video on demand asset and the forecast number of views within each of the time bins is representative of the forecasted number of views of each particular video on demand asset during a predetermined time period that is greater than a time period of the bin, the method further comprising:
translating, by the data processing apparatus, the broadcast program channel scheduling instructions into the scheduling criteria for dynamically inserting the advertising content during playback of any of the particular video on demand assets during the predetermined time period associated initiated within the selected time bin.

11. A computerized system for scheduling advertising content for dynamic insertion during playback of video on demand assets, comprising:
a gateway computer in communication with a remote scheduling server computer that performs manual advance scheduling of advertising content insertion in avails of broadcast program channels;
the gateway computer generates schedule and viewership data representing a predefined playback schedule for a virtual broadcast program channel associated with one or more video on demand assets, the defining predefined schedule comprising a plurality of predetermined time bins spanning a number of hours, the predefined schedule identifying a forecast number of expected views of the video on demand assets during each of the time bins and at least one avail for each of the time bins;
the gateway computer transmits the predefined schedule of the virtual broadcast program channel to the remote scheduling server in a format used by the remote scheduling server for performing manual advance scheduling of advertising content insertion in avails of broadcast program channels, the predefined schedule being transmitted to manually schedule advertising content for insertion in the at least one avail for each of the time bins of the virtual broadcast program channel prior to playback of the one or more video on demand assets;
the gateway computer receives the advertising content and broadcast program channel scheduling instructions from the remote scheduling server, the broadcast scheduling instructions identifying the virtual broadcast program channel and a selected avail within a selected time bin for insertion of the advertising content; and
the gateway computer translates the broadcast program channel scheduling instructions into scheduling criteria for dynamically inserting the advertising content during playback of any of the video on demand assets that comprise the virtual broadcast program channel initiated within the selected time bin.

12. The system of claim 11, wherein
the gateway computer is in communication with a subscriber device, the gateway computer receives a request from the subscriber device within the selected time bin to playback a video on demand asset associated with the virtual broadcast program channel; and
the gateway computer inserts the advertising content during playback of the video on demand asset to the subscriber device according to the scheduling criteria.

13. A computer program product, tangibly embodied in a machine-readable storage device, the computer program product including instructions being operable to cause a data processing apparatus to schedule advertising content for dynamic insertion during playback of video on demand assets, comprising:
generate schedule and viewership data representing a predefined playback schedule for a virtual broadcast program channel associated with one or more video on demand assets, the predefined schedule comprising a plurality of predetermined time bins spanning a number of hours, the predefined schedule identifying a forecast number of expected views of the virtual channel assets during each of the time bins and at least one avail for each of the time bins;

transmit the predefined schedule of the virtual broadcast program channel to a remote scheduling server in a format used by the remote scheduling server for performing manual advance scheduling of advertising content insertion in avails of broadcast program channels, the predefined schedule being transmitted to the remote scheduling server to manually schedule advertising content for insertion in the at least one avail for each of the time bins of the virtual broadcast program channel prior to playback of the one or more video on demand assets:

receive the advertising content and broadcast program channel scheduling instructions from the remote scheduling server, the broadcast program channel scheduling instructions identifying the virtual broadcast program channel and a selected avail within a selected time bin for insertion of the advertising content; and translate the broadcast program channel scheduling instructions into scheduling criteria for dynamically inserting the advertising content during playback of any of the virtual channel assets initiated within the selected time bin.

* * * * *